(12) United States Patent
Yakovlev (10) Patent No.: US 7,593,956 B1
(45) Date of Patent: Sep. 22, 2009

(54) INTERFACE TO A HUMAN INTERFACE INFRASTRUCTURE DATABASE IN AN EXTENSIBLE FIRMWARE INTERFACE ENVIRONMENT

(75) Inventor: Sergiy B. Yakovlev, Duluth, GA (US)

(73) Assignee: American Megatrends, Inc., Norcross, GA (US)

(*) Notice: Subject to any disclaimer, the term of this patent is extended or adjusted under 35 U.S.C. 154(b) by 245 days.

(21) Appl. No.: 11/496,148

(22) Filed: Jul. 31, 2006

(51) Int. Cl.
*G06F 17/00* (2006.01)
*G06F 12/00* (2006.01)

(52) U.S. Cl. .................. 707/102; 707/204; 707/103 R; 710/10; 715/700; 715/735

(58) Field of Classification Search .......................... None
See application file for complete search history.

(56) References Cited

U.S. PATENT DOCUMENTS

2004/0252122 A1* 12/2004 Rothman et al. ............ 345/467
2005/0144428 A1* 6/2005 Rothman et al. ................ 713/1

OTHER PUBLICATIONS

Specification entitled, Intel Platform Innovation Framework for EFI Human Interface Infrastructure Specification, dated Oct. 21, 2005, pp. 1-145, Version 0.92.

* cited by examiner

*Primary Examiner*—Greta L Robinson
*Assistant Examiner*—James J Wilcox
(74) *Attorney, Agent, or Firm*—Hope Baldauff Hartman, LLC (57) ABSTRACT

An improved HII database driver is provided in an EFI environment. The HII database driver is capable of storing extended information regarding an HII component in an HII database at the time the package containing the HII component is parsed for inclusion in the HII database. Extended information for a string may include length of the string in Unicode characters or the length of the string in narrow screen glyphs. The HII database driver also exposes methods through which the extended information may be retrieved from the HII database. The extended information may be utilized to allocate an appropriately sized buffer for storing the string.

9 Claims, 6 Drawing Sheets

INTERFACE TO A HUMAN INTERFACE INFRASTRUCTURE DATABASE IN AN EXTENSIBLE FIRMWARE INTERFACE ENVIRONMENT

BACKGROUND

In most computing systems, low level instruction code is used as an intermediary between the hardware components of the computing system and the operating software and other high level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been created. The new specification is called the Extensible Firmware Interface ("EFI") Specification and is available from INTEL CORPORATION. The original EFI Specification from INTEL CORPORATION is also being extended by the Unified Extensible Firmware Interface Forum ("UEFI").

The EFI Specification describes an interface between the operating system and the system firmware. In particular, the EFI Specification defines the interface that platform firmware must implement and the interface that the operating system may use in booting. How the firmware implements the interface is left up to the manufacturer of the firmware. The EFI Specification also specifies that protocols should be provided for EFI drivers to communicate with each other. An EFI protocol is an interface definition provided by an EFI driver. The EFI core provides protocols for allocation of memory, creating events, setting the clock, and many others.

In order to provide functionality for providing user input and output in an EFI-based firmware, the EFI Specification provides for a Human Interface Infrastructure ("HII") database. The HII database is maintained within EFI and is used to store strings and fonts utilized by drivers executing within the EFI environment. Forms and other user interface properties may also be stored in the HII database. An HII database driver creates and maintains the HII database.

In order to provide access to the HII database to other drivers executing within EFI, the HII database driver exposes an HII database protocol interface. Other drivers executing within EFI can utilize the HII database protocol interface to store and retrieve data in the HII database. For instance, the HII database driver provides functionality for registering packages (also referred to herein as "packs") containing forms, strings, and fonts, and for storing the contents of these packs in the HII database. The HII database driver also provides functions for retrieving information about the data contained in the HII database and the data itself. The HII database protocol interface exposed by the HII database driver is specifically defined in the INTEL Platform Innovation Framework for EFI HII Specification (the "Framework"), which is expressly incorporated herein by reference.

The implementation of the HII database driver suggested by the Framework suffers from at least one drawback. In particular, when an EFI driver (also referred to herein as a "requestor") requests a string contained in the HII database from the HII database driver, the requestor provides a pointer to a memory buffer for the HII database driver to copy the string into. The requestor also informs the HII database driver of the size of the buffer. The HII database driver must then validate the buffer by calculating the length of the requested string and determining whether the provided buffer is large enough to hold the string. If the provided buffer is large enough, the HII database driver copies the requested string into the buffer. If, however, the provided buffer is not large enough, the HII database driver returns an error and an indication of the buffer size needed to contain the requested string. The requester must then deallocate the previous buffer, create a sufficiently large memory buffer to hold the string, and generate another request to the HII database driver for the string. Calculating the size of a string each time a request for the string is made and requiring the requestor to create a second buffer in the event that the first buffer is not large enough is a very inefficient process for obtaining a string from the HII database.

It is with respect to these considerations and others that the various embodiments of the invention have been made.

SUMMARY

In accordance with the present invention, the above and other problems are solved by methods, apparatus, and computer-readable media for providing a supplemental HII database protocol interface in an EFI environment. Through the use of the supplemental interface, requestors can obtain the length of strings and other extended information regarding HII components stored in the HII database prior to allocating memory for storing the components. The retrieved information can then be utilized to allocate an appropriately sized memory buffer for storing the string or other HII component.

According to one aspect of the invention, a method is provided for exposing a supplemental HII database protocol interface within an EFI environment. According to the method, the HII database driver exposes a second interface in addition to the Framework-required interface for accessing the contents of the HII database. The second interface provides more efficient methods for storing and retrieving information in the HII database than the implementation described by the Framework. For instance, as described herein, the HII database driver may receive a request to store the contents of a package in an HII database on the secondary HII database protocol interface. In response to the request, the HII database driver parses the package and identifies any HII components contained therein. HII components are items that may be stored in the HII database, such as strings, forms, or fonts. HII components may also be referred to herein as human interface data.

Once the extended HII database driver has identified any HII components in the package, extended information may be computed for the HII components. Extended information comprises any information not contemplated by the standard HII database protocol interface defined by the EFI Specification. For instance, the secondary HII database protocol interface may calculate the length of a string contained in the package in Unicode characters. The second HII database protocol interface may also calculate the number of narrow screen glyphs necessary to display the string on a display screen. The extended information is then stored in the HII database along with the HII component extracted from the package.

Through the secondary HII database protocol interface, the HII database driver also exposes a method for allowing calling drivers to retrieve the extended information from the HII database. For instance, a get extended string information method may be exposed by the HII database driver that allows callers to retrieve the extended information stored in the HII database for a string. In particular, using the method a calling driver can obtain the length of a string contained in the package in Unicode characters and the number of narrow screen glyphs necessary to display the string on a display screen. Once the caller has this information, the caller may allocate an appropriately sized memory buffer for holding the string. The caller may then pass a pointer to the memory buffer to the HII database driver with a request that the string be copied into the buffer. Alternatively, the caller may copy the string from the HII database directly into the buffer itself. The HII database driver provided herein may also expose methods for obtaining the extended information for other types of HII components stored in the HII database, such as forms and fonts.

Aspects of the invention may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

Embodiments of the present invention provide methods, systems, apparatuses, and computer-readable media for providing a secondary HII database protocol interface in an EFI environment. In the following detailed description, references are made to the accompanying drawings that form a part hereof, and in which are shown by way of illustration specific embodiments or examples. Referring now to the drawings, in which like numerals represent like elements throughout the several figures, aspects of the present invention and the exemplary operating environment will be described.

Figure 1:
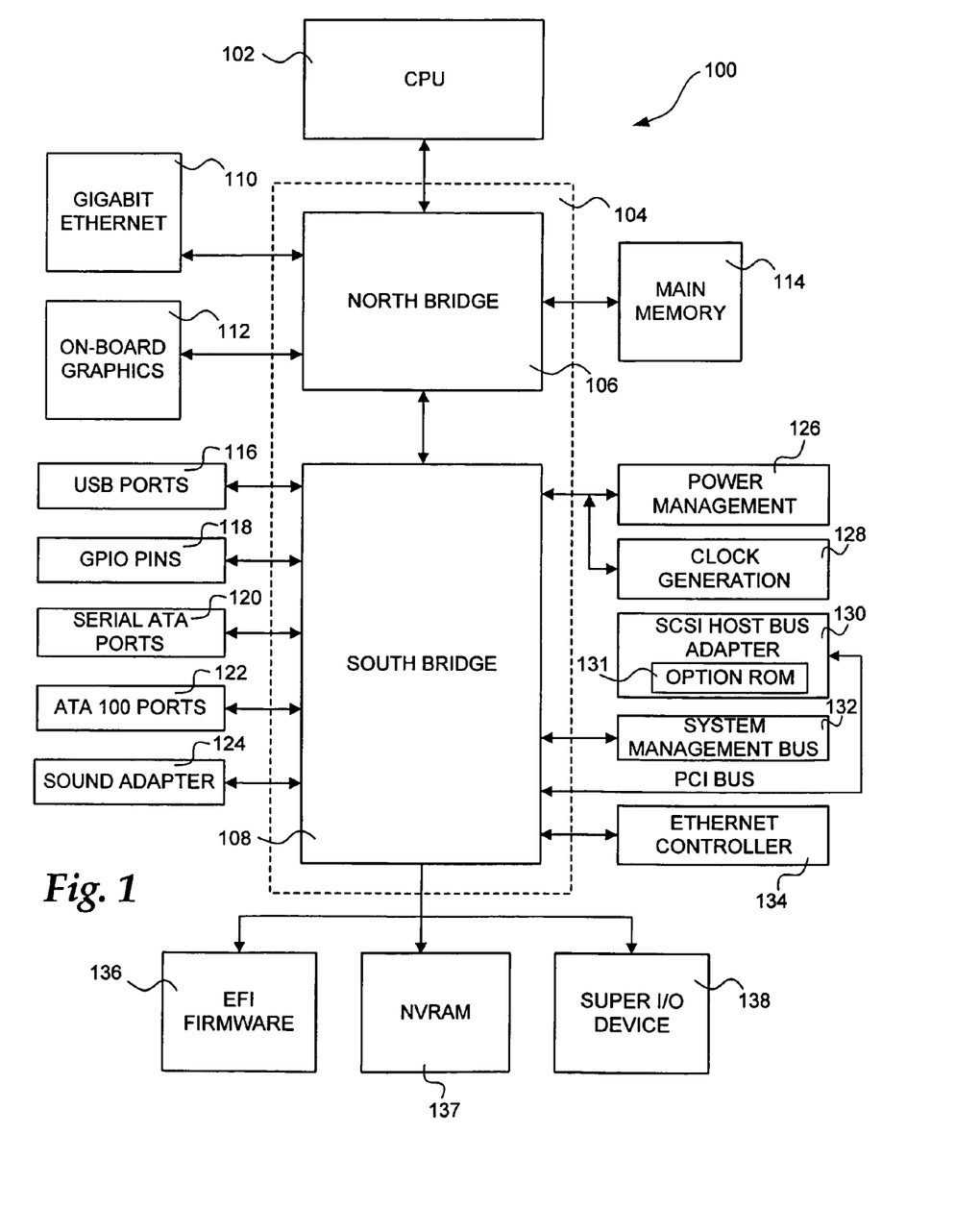
FIG. 1 is a computer architecture diagram that illustrates various components of a computer that provides an illustrative operating environment.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments of the present invention will be described. It should be appreciated that although the embodiments of the invention described herein are discussed in the context of a conventional desktop or server computer, the embodiments of the invention may be utilized with virtually any type of computing device. FIG. 1 shows an illustrative computer architecture for a computer 100 that is operative to provide an EFI firmware having an HII database driver that provides two interfaces for accessing the contents of a HII database. As described in greater detail herein, the first interface is compatible with the Framework. The second interface provides additional functionality as described herein.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system-compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more serial ATA ports 120 and an ATA100 adapter for providing one or more ATA100 ports 122. The serial ATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108 and the SCSI host bus adapter 130, and their associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The EFI firmware 136 comprises a firmware that is compatible with the EFI Specification and the Framework. Additional details regarding the operation of the EFI firmware 136 are provided below with respect to FIGS. 2-3. The LPC interface may also be utilized to connect a NVRAM 137 to the computer 100. The NVRAM 137 may be utilized by the firmware 136 to store configuration data for the computer 100. In further embodiments, the configuration data for the computer 100 may be stored on the same NVRAM 137 as the firmware 136.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
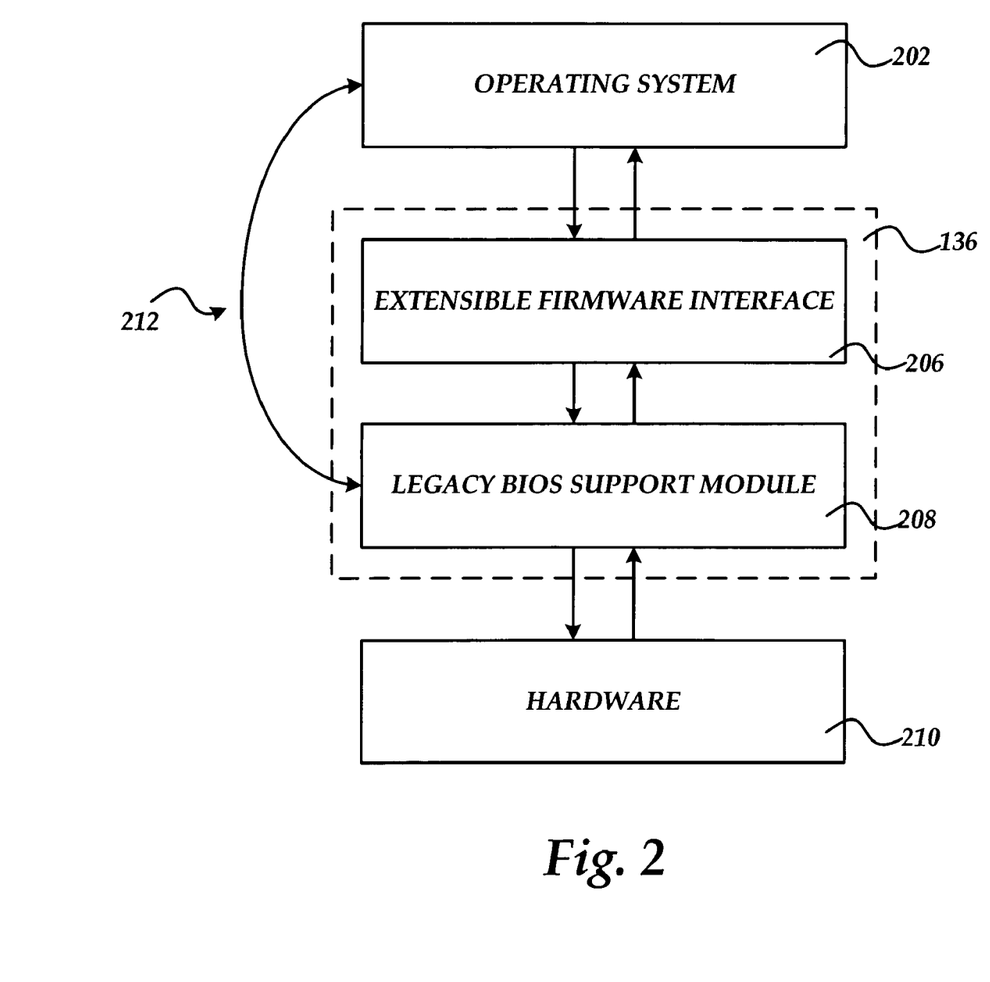
FIGS. 2 and 3 are computer architecture diagrams that illustrate aspects of an EFI environment utilized by the embodiments of the invention.

Referring now to FIG. 2, additional details regarding the operation of the EFI firmware 136 of the computer 2 will be described. As described above, the firmware 136 comprises a firmware compatible with the EFI Specification from INTEL CORPORATION or from the UEFI FORUM. The EFI Specification describes an interface between the operating system 202 and the system firmware 136. The EFI Specification defines the interface that platform firmware must implement, and the interface that the operating system 202 may use in booting. How the firmware 136 implements the interface is left up to the manufacturer of the firmware. The intent of the Specification is to define a way for the operating system 202 and firmware 136 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 206 and a legacy BIOS support module 208 may be present in the firmware 136. This allows the computer 100 to support both firmware interfaces. In order to provide this functionality, an interface 212 may be provided for use by legacy operating systems and applications. Additional details regarding the architecture and operation of the EFI 206 are provided below with respect to FIG. 3. Moreover, additional details regarding the operation and architecture of EFI can be found in the EFI Specification and the Framework, which are available from INTEL CORPORATION and expressly incorporated herein by reference. As will be described in greater detail below, the EFI Framework also includes a Human Interface Infrastructure Specification. This Specification is also expressly incorporated herein by reference.

Figure 3:
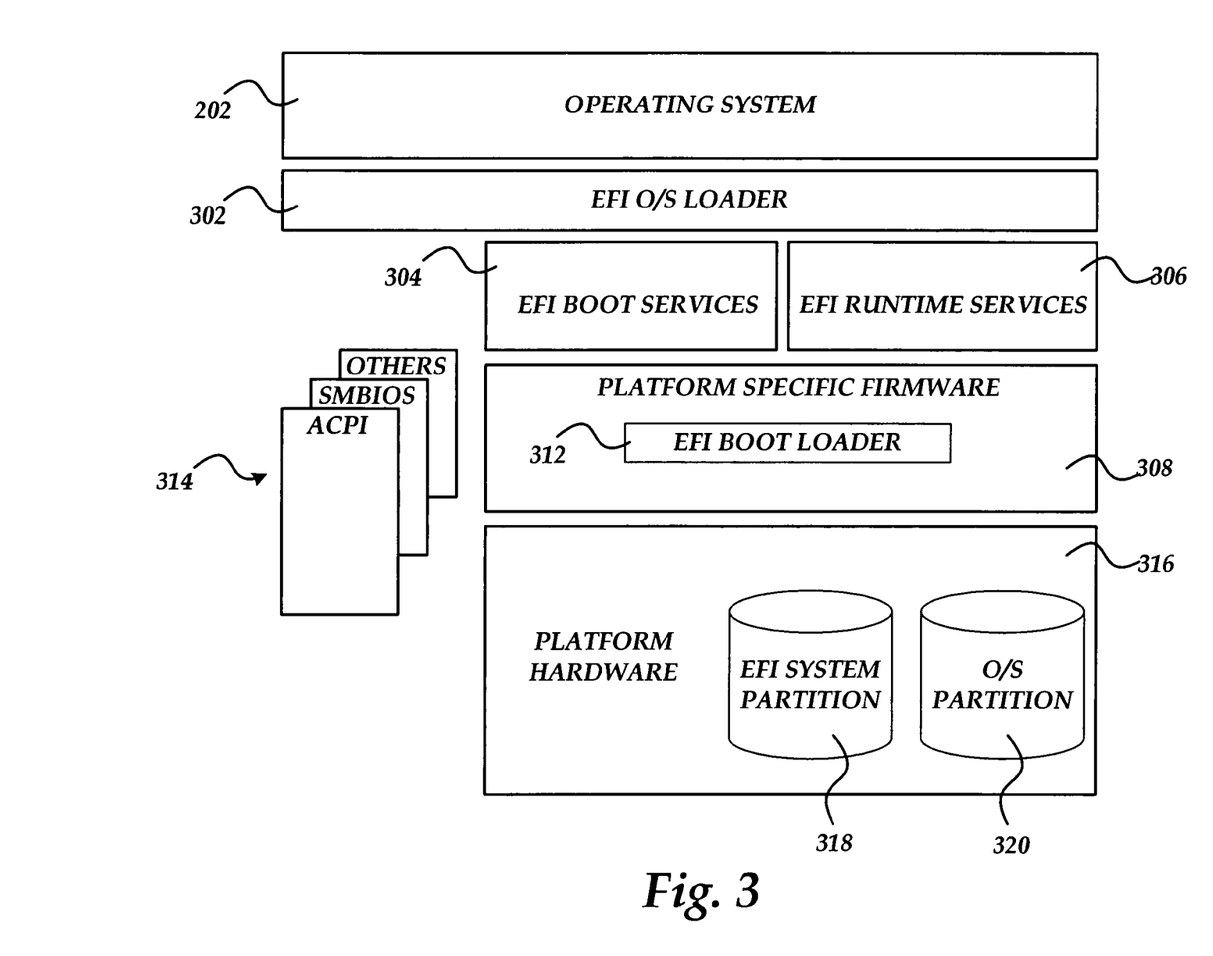

Turning now to FIG. 3, additional details regarding an EFI Specification-compliant system utilized to provide an operating environment for the various embodiments of the invention will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. is EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order.

The various program modules executing within the EFI may have a need to receive user input or to display information on an output device, such as a display screen. In order to provide this functionality, the EFI firmware 136 provides an HII database and an HII database driver that exposes methods for accessing the database through a HII database protocol interface. The HII database driver maintains the internal data structures for storing information in the HII database, and for providing access to input devices, forms, strings, and fonts stored in the HII database. According to the embodiments provided herein, the HII database driver is operative to provide two interfaces for accessing the HII database. The first interface is an interface that is compatible with the HII protocol as defined in the Framework. Additional details regarding the structure and operation of the standard HII protocol are provided below with respect to FIG. 4. The second interface provides additional functionality as described below with respect to FIGS. 5-6B.

Figure 4:
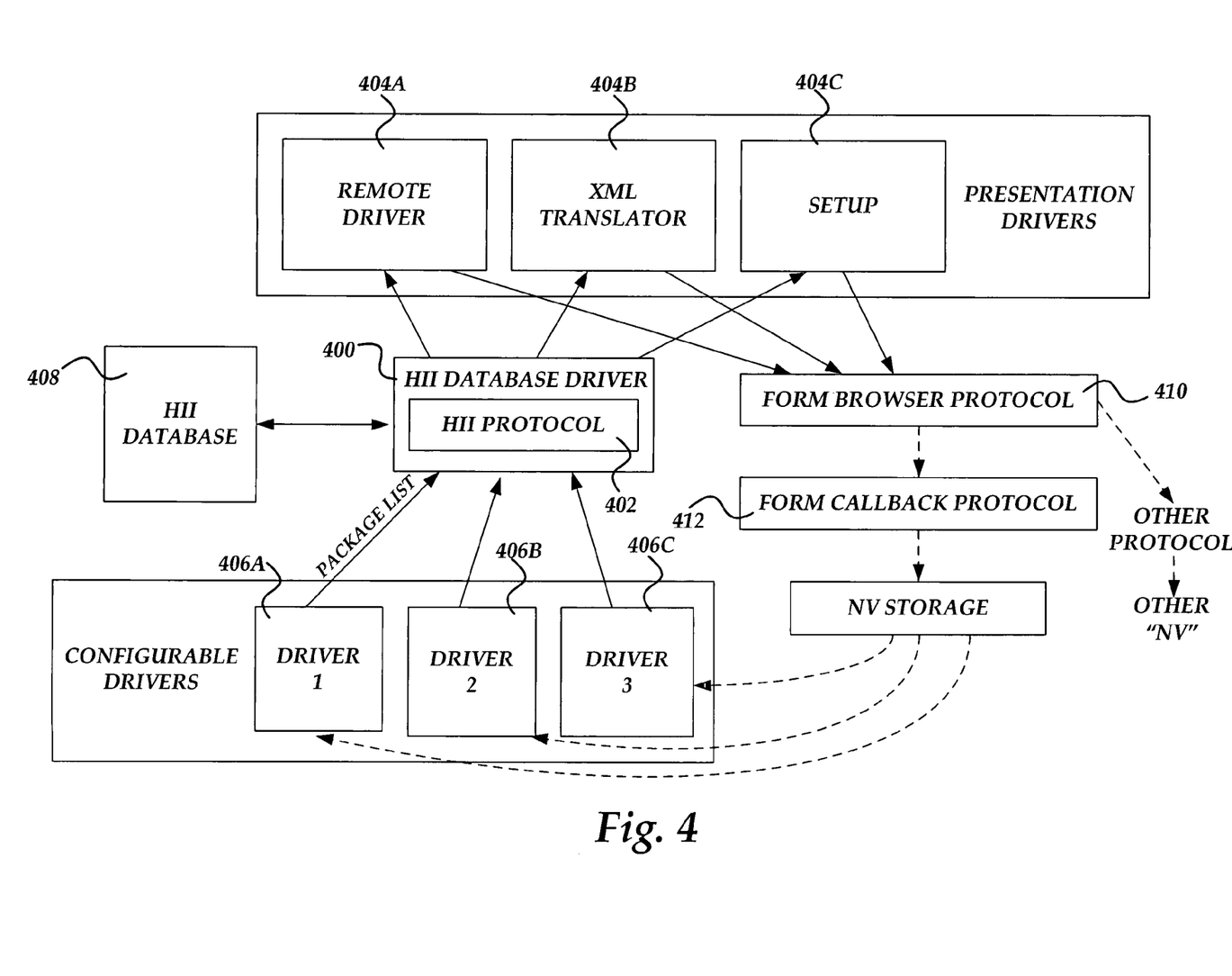
FIG. 4 is a block diagram depicting the model that is utilized within the EFI environment to manage human interface components.

Referring now to FIG. 4, an illustrative software model utilized inside the EFI framework to manage human interface components will be described. In particular, the software model shown in FIG. 4 is utilized to manage human interface data within an EFI environment. Human interface data may include fonts, strings, and forms. Each of these is represented by a variable length data structure known as a package (or a "pack"). The INTEL Platform Innovation Framework for EFI HII Specification defines the format for the human interface data and the packages that contain them.

During boot up of a computer 100 based upon the EFI framework, it may be necessary to display different kinds of data and, hence, display of this data must be supported by the firmware 136. For instance, it may be desirable to display graphical displays, text, query and response dialog boxes, and setup information during the boot process. The human interface data necessary to display this information is submitted to the HII database driver 400 for storage in the HII database 408 by drivers 406A-406C executing within the EFI preboot environment. In particular, packages are submitted to the HII database driver 400 to be stored in the HII database 408. Package lists may be submitted to the HII database driver 400 that identify different packages to be stored in the HII database 408. Different packages identified by the list are handed differently. Font packages are integrated into existing font data, thereby expanding the available font characters (also referred to herein as "glyphs"). String and form information is handled by assigning a handle to the "subdatabase." These handles are then used to refer to the packages by the drivers 406A-406C themselves, as well as other drivers, such as the presentation drivers 404A-404C, that make use of the information stored in the HII database 408. As shown in FIG. 4, the HII database protocol 400 exposes a HII database protocol interface 402. The protocol interface 402 is discoverable by other drivers executing within the EFI environment and provides an interface to the functions provided by the HII database driver 400. The protocol interface 402 is compatible with the HII database protocol specified in the Framework.

A string package defines a list of strings in a particular language or a related set of languages. Numerous string packages may exist in a single package to implement support for multiple language sets. A string is generally a C-style Unicode string, although it may contain special EFI-specific formatting characters as well. A string is referred to by a STRING_TOKEN, which is a constant usually assigned during the build process. A STRING_TOKEN is contained in a variable of type STRING_REF. The difference in the two makes it simpler to determine if an element is referring to a string or a container for a reference to a string. Packages are also defined by EFI for storing forms and fonts. A form browser protocol 410 and a form callback protocol 412 are also defined by EFI for interacting with forms stored in the H II database 408.

Figure 5:
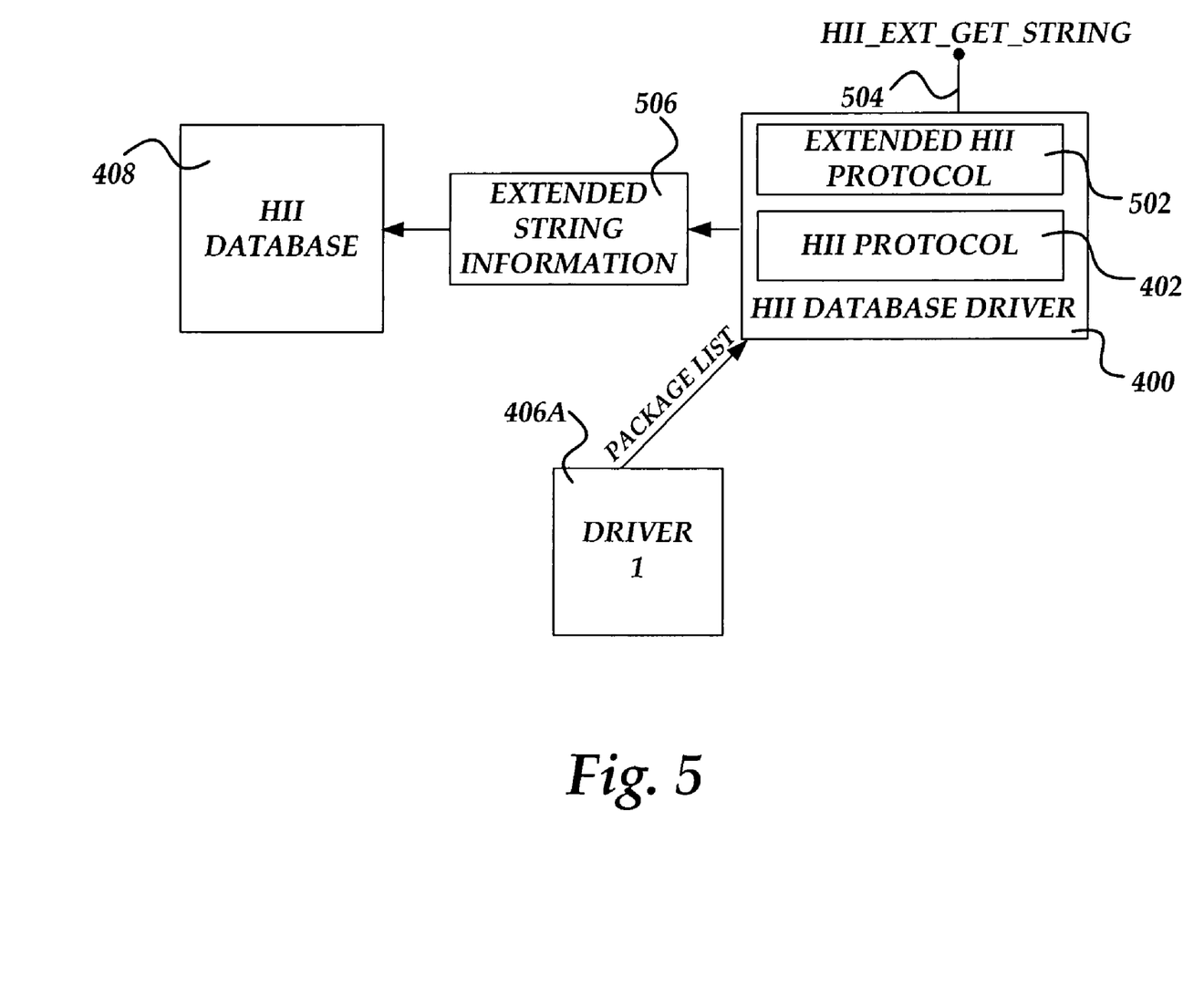
FIG. 5 is a block diagram illustrating aspects of a HII database driver provided herein.

Turning now to FIG. 5, additional details will be provided regarding the structure and operation of an improved HII database driver 400 provided herein. As shown in FIG. 5, the HII database driver 400 provided herein exposes the HII database protocol interface 402 for interacting with the HII database 408 in the manner specified by the Framework. The HII database driver 400 also exposes a second protocol, the extended HII database protocol interface 502. The extended HII database protocol interface 502 exposes methods provided by the HII database driver 400 for generating extended information regarding the human interface data stored in a package and for storing the extended information in the HII database 408. Through the methods exposed by the extended HII database protocol interface 502, the extended information is also made available to calling programs.

According to one embodiment of the invention, the HII database driver 400 is operative to receive a package list from a driver 406A. In response to receiving the package list, the HII database driver 400 is further operative to identify the string packages and the strings identified therein. For each string, the HII database driver 400 is operative to compute extended string information 506 for the string. For instance, according to one embodiment of the invention, the HII database driver 400 is operative to calculate the length of the string in Unicode characters. This value is then stored by the HII database driver 400 with the string in the HII database 408.

According to another embodiment of the invention, HII database driver 400 is further operative to calculate the number of narrow screen glyphs necessary to display the string on a display screen. EFI defines two standard glyph sizes: narrow and wide. The preferred dimensions are 8×19 pixels for narrow glyphs and 16×19 pixels for wide glyphs. These dimensions yield about 31 lines of 100 characters on an 800×600 pixel display screen. Once the HII database driver 400 has calculated the number of narrow screen glyphs necessary to display the string on a display screen this information is also stored in the HII database 408. Extended information for forms and fonts may also be generated by the HII database driver 400 and stored in the HII database 408 at the time a package is parsed. It should be appreciated that Unicode characters may be spacing or non-spacing. If a character is non-spacing, the character is displayed on top of another character at the same position.

According to aspects of the invention, the HII database driver 400 also exposes methods for calling drivers to obtain the extended information stored in the HII database 408. For instance, according to one embodiment of the invention, HII database driver 400 exposes a get extended string information method (HII_EXT_GET_STRING) through which a calling driver can obtain the extended string information 506 for a string stored in the HII database 408. For instance, through this method, a calling driver can obtain the length of the string in Unicode characters and the number of narrow screen glyphs necessary to display the string on a display screen. With this information, the calling driver can allocate a memory buffer large enough to store the string. A pointer to the memory buffer may then be passed to the HII database driver 400 with a request that the string be copied into the buffer. Alternatively, the calling driver may copy the string directly into the buffer itself. Similar methods may also be exposed for obtaining extended information stored in the HII database 408 for forms and fonts.

Figure 6A:
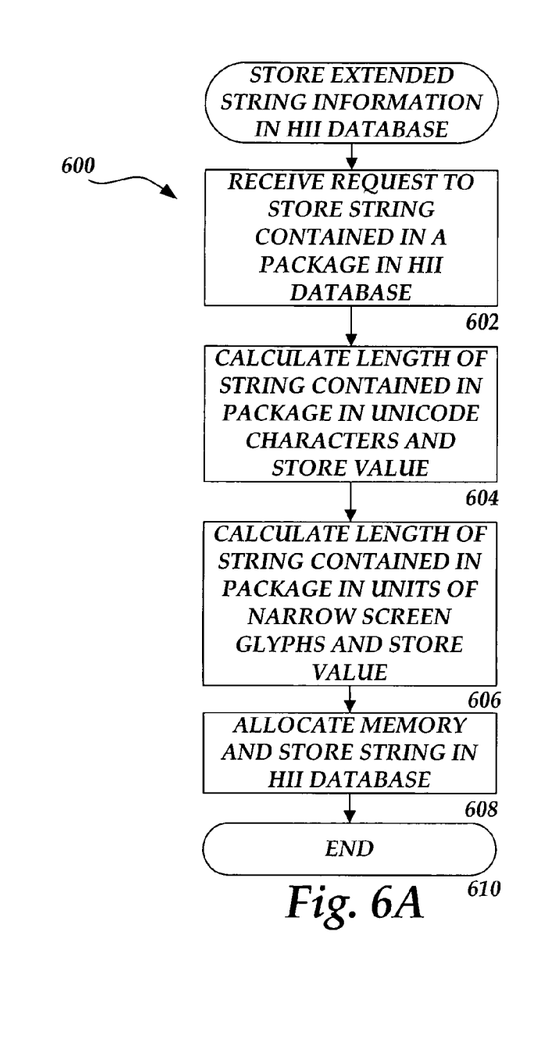
FIGS. 6A-6B are flow diagrams illustrating processes for registering a package with a HII database driver provided herein and for obtaining extended string information from an HII database driver provided herein, respectively.

Referring now to FIG. 6A, an illustrative routine 600 will be described in detail for storing extended string information in the HII database 408. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where the HII database driver 400 receives a request from a driver to store the contents of a package in the HII database 408. In particular, the package may include a string that is to be stored in the HII database. In response to the request, the routine 600 continues to operation 604, where the HII database driver 400 computes the extended information for the string. In particular, the HII database driver 400 computes the length of the string in Unicode characters. At operation 606, the HII database driver 400 computes addition extended information for the string in the form of the number of narrow screen glyphs necessary to display the string on a display screen. Once the extended information has been calculated, the HII database driver 400 allocates space in the HII database 408 and stores the string and the extended information therein. The routine 600 then continues from operation 608 to 610, where it ends.

Figure 6B:
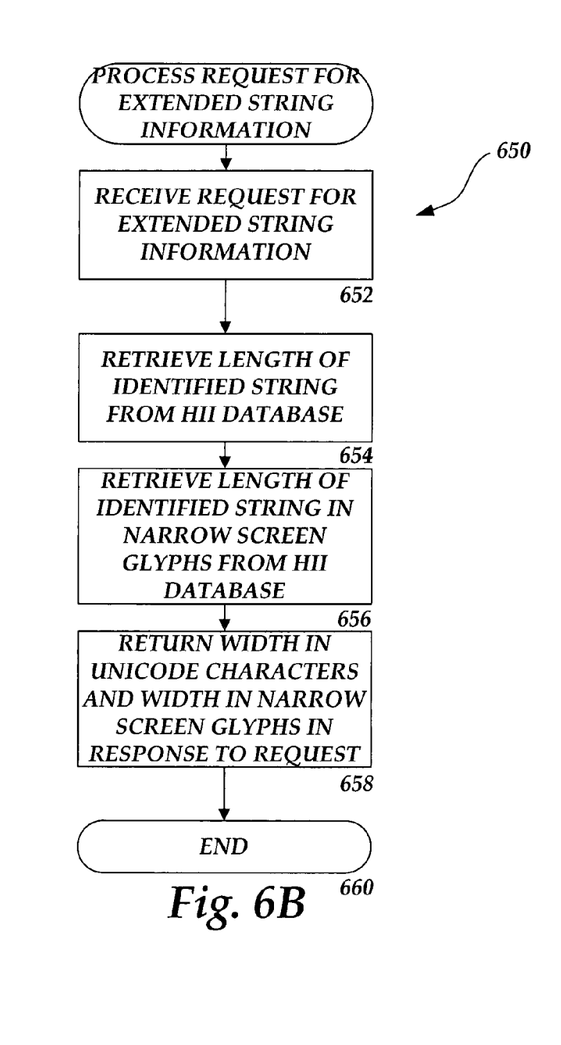

Turning now to FIG. 6B, additional details will be provided regarding an illustrative routine 650 for retrieving extended string information from the HII database 408. In particular, the routine 650 begins at operation 652, where the HII database driver 400 receives a request for extended string information for a string. This request may come in the form of a call to the HII_EXT_GET_STRING method. In response to the request, the routine 650 continues to operation 654, where the HII database driver 400 retrieves the length of the identified string in Unicode characters from the HII database 408. The routine 650 then continues to operation 656, where the HII database driver 400 retrieves the length of the string as expressed in the number of narrow screen glyphs necessary to display the string on a display screen. One the extended information has been retrieved, the routine 650 continues to operation 658, where this information is returned to the calling driver in the form of a response to the HII_EXT_GET_STRING call. The routine 650 then continues to operation 660, where it ends.

Once the extended information has been retrieved from the HII database 408 as described above with respect to FIG. 6B, this information may be utilized by a driver to obtain the actual string in one of several ways. First, the driver may make a call to the HII database driver 400 for the string. In particular, because the driver has data regarding the actual size of the string, the driver can allocate an appropriately sized buffer. A pointer to the buffer is then passed to the HII database driver 400 along with the request for the string. The HII database driver 400 then copies the string into the buffer. There is no need for the HII database driver 400 to determine the actual size of the string when such a request has been made, because the correct size of the string has previously been provided to the calling driver. Alternatively, the driver may allocate an appropriately sized buffer for the string, obtain a pointer to the string from the HII database driver 400, and then copy the string to the buffer itself.

It should be appreciated that although the embodiments of the invention described herein have been presented in the context of providing extended data regarding strings stored within the HII database 408, the invention applies also to other types of form data stored in the database 408. For instance, the embodiments of the invention could be applied to providing extended data regarding forms and fonts stored within the HII database 408. It should also be appreciated that embodiments of the present invention provide methods, systems, apparatuses, and computer-readable media for providing an extended interface to an HII database in an EFI firmware operating environment. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A computer-implemented method for providing an extended interface to a human interface infrastructure (HII) database in an extensible firmware interface (EFI) environment, the method comprising computer-implemented operations for:

receiving, through a HII database driver, a request to store the contents of a package in an HII database maintained in the EFI environment;

in response to the request, identifying a HII component stored in the package prior to storing the HII component in the HII database, the HII component comprising a string;

extracting the HII component from the package prior to storing the HII component in the HII database;

computing extended information regarding the identified HII component prior to storing the HII component in the HII database, the extended information comprising the length of the string in Unicode characters and the number of narrow screen glyphs necessary to display the string on a display screen;

upon identifying the HII component stored in the package and computing the extended information regarding the identified HII component, storing the extracted HII component and the extended information regarding the identified HII component in the HII database;

exposing, through the HII database driver, a method for enabling calling drivers to retrieve the extended information from the HII database, the method for enabling calling drivers to retrieve the extended information from the HII database comprising a get extended string information method for retrieving the length of the string in Unicode characters and the number of narrow screen glyphs necessary to display the string on a display screen;

allocating a memory buffer the size of the length of the string in Unicode characters based on the extended information; and copying the string from the HII database to the allocated memory buffer.

2. A computer-readable medium having computer-executable instructions stored thereon which, when executed by a computer, cause the computer to perform the method of claim 1.

3. A computer-controlled apparatus capable of performing the method of claim 1.

4. A computer-implemented method for exposing extended information regarding a human interface infrastructure (HII) component stored in a human interface infrastructure (HII) database, the method comprising computer-implemented operations for:

extracting the HII component from a package;

computing the extended information regarding the HII component at the time that a package containing the HII component is registered with the HII database, the HII component comprising a string, a form, or a font, the extended information comprising the length of the string, information regarding the form, or information regarding the font, the extended information further comprising the number of narrow screen glyphs necessary to display the string on a display screen;

storing the extracted HII component and the extended information in the HII database;

exposing a method within an extensible firmware environment for enabling a caller to retrieve the extended information regarding the HII component from the HII database, the method for retrieving the extended information from the HII database comprising a get extended string information method for retrieving the length of the string in Unicode characters and the number of narrow screen glyphs necessary to display the string on a display screen;

receiving a call to the method from the caller; and in response to the call, retrieving the extended information from the HII database and returning the extended information to the caller in response to the call, the caller operative to allocate an appropriately sized memory buffer to hold the HII component.

5. A computer-readable medium having computer-executable instructions stored thereon which, when executed by a computer, cause the computer to perform the method of claim 4.

6. A computer-controlled apparatus capable of performing the method of claim 4.

7. A computer-implemented method for providing extended information regarding a human interface infrastructure (HII) component stored in an HII database within an extensible firmware interface (EFI) environment, the method comprising computer-implemented operations for:

receiving, through a HII database driver, a request to store a string contained in a package in the HII database;

extracting the string from the package;

in response to the request, computing the length of the string in Unicode characters and the number of narrow screen glyphs needed to display the string on a display screen and storing the computed string length, the number of narrow screen glyphs, and the string in the HII database;

exposing, through the HII database driver, a get extended string information method through which calling drivers may obtain the string length information stored in the HII database;

receiving, from one of the calling drivers, a call to the method, the call identifying a string stored in the HII database, the call enabling a caller associated with the one of the calling drivers to retrieve the string length and the number of narrow screen glyphs from the HII database;

in response to receiving the call, retrieving from the HII database the string length in Unicode characters and narrow screen glyphs for the identified string, and returning, through the calling driver, the retrieved information to the caller, the caller operative to allocate an appropriately sized memory buffer to hold the HII component;

receiving a call requesting the identified string from the HII database;

in response to the call, allocating a memory buffer the size of the string length in Unicode characters;

copying the identified string from the HII database to the allocated memory buffer; and returning a pointer to the memory buffer in response to the call.

8. A computer-readable medium having computer-executable instructions stored thereon which, when executed by a computer, cause the computer to perform the method of claim 7.

9. A computer-controlled apparatus capable of performing the method of claim 7.

* * * * *